United States Patent

Ando et al.

[11] Patent Number: 5,851,258
[45] Date of Patent: Dec. 22, 1998

[54] BACKUP STRUCTURE FOR A PIPE FOR FEEDING A MOLTEN SUBSTANCE OF HIGH TEMPERATURE

[75] Inventors: Hiroshi Ando, Yokohama; Fumiaki Saito, Aichi; Chikao Tanaka; Shinji Takeshita, both of Yokohama; Koji Hirasawa, Takasago; Sei Nagano, Yokohama; Hajime Ito, Yokohama; Shinji Yamamura, Yokohama, all of Japan

[73] Assignee: Asahi Glass Company Ltd., Tokyo, Japan

[21] Appl. No.: 698,863

[22] Filed: Aug. 16, 1996

[30] Foreign Application Priority Data

Aug. 21, 1995 [JP] Japan ..................... 7-211739

[51] Int. Cl.⁶ ........................... C03B 5/28
[52] U.S. Cl. ..................... 65/329; 65/32.5; 65/134.9; 65/325; 65/375; 65/495; 138/106; 138/107; 138/119; 138/149
[58] Field of Search ............... 65/32.5, 134.9, 65/183, 325, 326, 327, 328, 329, 330, 331, 332, 495, 496, 497, 498, 499; 138/106, 107, 119, 149

[56] References Cited

U.S. PATENT DOCUMENTS

| | | | |
|---|---|---|---|
| 2,962,051 | 11/1960 | Burkes, Jr. ............... | 138/149 |
| 3,519,412 | 7/1970 | Olink ....................... | 65/337 |
| 4,951,714 | 8/1990 | Detzel et al. ............. | 138/106 |
| 5,316,563 | 5/1994 | Ishimura et al. ........ | 65/32.5 |

FOREIGN PATENT DOCUMENTS

| | | |
|---|---|---|
| 0 004 576 | 10/1979 | European Pat. Off. . |
| 0 142 762 | 5/1985 | European Pat. Off. . |
| 0 556 576 | 8/1993 | European Pat. Off. . |
| 2 092 647 | 1/1972 | France . |
| 2 302 345 | 9/1976 | France . |
| 2-221129 | 9/1990 | Japan . |
| 3-33020 | 2/1991 | Japan . |
| 3-69516 | 3/1991 | Japan . |
| 4-31325 | 2/1992 | Japan . |
| 5-58646 | 3/1993 | Japan . |
| 5-208830 | 8/1993 | Japan . |
| 5-208845 | 8/1993 | Japan . |
| 5-229831 | 9/1993 | Japan . |
| 6-305735 | 11/1994 | Japan . |
| 2 136 528 | 9/1984 | United Kingdom . |

OTHER PUBLICATIONS

Patent Abtracts of Japan, vol. 15, No. 163, Apr. 24, 1991, JP–A–03 033020, Feb. 13, 1991.
Patent Abtracts of Japan, vol. 17, No. 367, Jul. 12, 1993, JP–A–05 058646, Mar. 9, 1993.

*Primary Examiner*—Stanley S. Silverman
*Assistant Examiner*—Sean Vincent
*Attorney, Agent, or Firm*—Oblon, Spivak, McClelland, Maier & Neustadt, P.C.

[57] ABSTRACT

A backup structure for a pipe for feeding a molten substance of high temperature has a pipe and a thermal insulation material surrounding the pipe wherein the pipe is provided with a plurality of projections on its outer periphery at predetermined intervals, and each of the productions is held at its both sides by the thermal insulation material.

11 Claims, 5 Drawing Sheets

BACKUP STRUCTURE FOR A PIPE FOR FEEDING A MOLTEN SUBSTANCE OF HIGH TEMPERATURE

The present invention relates to a backup structure for feeding a molten substance of high temperature used for a vacuum degassing apparatus for removing air bubbles in a molten material of high temperature in a process wherein a molten material of high temperature such as molten glass, molten metal or the like is continuously supplied.

As shown in FIG. 7, a vacuum degassing apparatus is employed in a process wherein molten glass G as a molten substance of high temperature in a melting tank 1 is degassed and is continuously fed to a successive treating furnace. Namely, the vacuum degassing apparatus has a vacuum housing 2 in which air is sucked in vacuum and a vacuum degassing vessel 3 which is accommodated in the vacuum housing 2. The vacuum degassing vessel 3 is communicated with an uprising pipe 4 through which the molten glass G as a molten substance of high temperature is introduced upwardly and then, subjecting to a degassing treatment. The vacuum degassing vessel is communicated with a downfalling pipe 5 through which the molten glass G after having subjected to the degassing treatment is introduced downwardly to the successive treating furnace. Housings 6 and 7 are provided around the uprising pipe 4 and the downfalling pipe 5, respectively, so as to insulatively surround the uprising pipe 4 and the downfalling pipe 5. The molten glass G is introduced to the vacuum degassing vessel 3 by a "siphon" effect, where the molten glass G is degassed. Such vacuum degassing vessel employing the "siphon" effect is described in U.S. Pat. No. 3,519,412, U.S. Pat. No. 5,316,563 and Japanese Unexamined Patent Publication Nos. 221129/1990, 33020/1991, 69516/1991, 31325/1992, 58646/1993, 208830/1993, 208845/1993, 229831/1993 and 305735/1994.

The uprising pipe 4 and the downfalling pipe 5 are made of a noble metal such as platinum since temperature of these pipes are elevated up to 1,200° to 1,400° C. by the molten glass G.

In the vacuum degassing apparatus of this kind, a pressure inside the vacuum degassing vessel 3 is reduced to $\frac{1}{20}$ to $\frac{1}{3}$ atmospheric pressure. Accordingly, it is necessary to set a difference of levels of the molten glass G in the melting tank 1 and the molten glass G in the vacuum degassing vessel 3, in accordance with a degree of vacuum in the vacuum degassing vessel 3. Accordingly, a determined difference of the levels may prolong the lengths of the uprising pipe 4 and the downfalling pipe 5 whereby the thermal expansion quantities of the uprising pipe 4 and the downfalling pipe 5 are increased.

Thermal insulation materials 6A, 7A are disposed in the housings 6, 7 respectively. The thermal insulation materials 6A, 7A also have a certain thermal expansion coefficient. However, since the thermal expansion coefficient of the thermal insulation materials 6A, 7A is different from that of the uprising pipe 4 or the downfalling pipe 5, there produces a difference of thermal expansion quantities between the thermal insulation materials 6A, 7A and the uprising pipe 4 or the downfalling pipe 5 whereby the structure of the vacuum degassing apparatus becomes unstable to thereby be insufficient in safety.

It is an object of the present invention to eliminate the above-mentioned disadvantage and to provide a backup structure for a pipe for feeding a molten substance of high temperature, which absorbs thermal expansion quantities of an uprising pipe and a downfalling pipe to improve safety in the apparatus.

To achieve the above-mentioned object, the present invention is to provide a backup structure for a pipe for feeding a molten substance of high temperature which comprises a pipe for feeding a molten substance of high temperature and a thermal insulation material surrounding the pipe wherein the pipe is provided with a plurality of projections on its outer periphery at predetermined intervals, and each of the projections is held at its both sides by the thermal insulation material.

In order to achieve the above-mentioned object, one embodiment of the present invention is to provide the above-mentioned backup structure wherein the pipe for feeding a molten substance of high temperature comprises a plurality of segmentary pipes arranged on the same axial line, and each of the segmentary pipes has a pair of flanges at its both ends so that each flange constitutes an element of each of the projections.

In order to achieve the above-mentioned object, one embodiment of the present invention is to provide the above-mentioned backup structure wherein a gap is formed between the pipe for feeding a molten substance of high temperature and the thermal insulation material so as to absorb a deformation of flexure of the pipe, and each of the projections is held at its both sides by the thermal insulation material so as to minimize the deformation.

In accordance with an aspect of the present invention, a thermal insulation material having a thermal expansion coefficient which is different from that of a pipe for feeding a molten material of high temperature is disposed around the pipe, a plurality of projections are formed outwardly from the pipe, and each of the projections is held at its both sides by the thermal insulation material. With this structure, each of the projections is fixed by the thermal insulation material. Accordingly, quantities of deformation of the pipes, which are caused by bending stresses in the pipes thermally expanded, are dispersed uniformly between adjacent projections of the pipes. Accordingly, the quantities of deformation of the pipes can be minimized.

In accordance with an aspect of the present invention, the pipes for feeding a molten substance of high temperature comprise a plurality of segmentary pipes which are arranged on the same axial line; each of the segmentary pipes has a pair of flanges as projections at its both ends and the thermal insulation material is clamped by the flanges. Accordingly, even when a segmentary pipe is deformed by a thermal bending force, the bending force is not transmitted to the adjacent segmentary pipes, whereby a quantity of deformation by bending in the pipe can further be minimized.

In accordance with an aspect of the present invention, a gap is formed between the outer periphery of the pipe and the thermal insulation material. Accordingly, a thermal expansion in the outer peripheral direction in the pipe when thermally expanded, is absorbed by the gap, whereby a deformation of the thermally expanded pipe due to forcible contact of it to the thermal insulation material, is avoidable.

In accordance with one embodiment of the present invention, the length of the supporting device in the direction along the pipe is made partially changeable between a time period that the pipe is in an elevated temperature and a time period that the pipe is not in an elevated temperature. In particular, the length of the supporting device in the direction along the pipe at the time of an evaluated temperature is elongated. Accordingly, thermal expansion quantity in the pipe can be absorbed.

In the invention mentioned just above, the supporting device further comprises a container for supporting the thermal insulation material wherein a part of the container has contraction and expansion properties. Accordingly, when the supporting device is in an elevated temperature, the part of the container is expanded whereby a thermal expansion quantity in the pipe can be absorbed.

In accordance with one embodiment of the present invention, there is provided a supporting device for supporting a thermal insulation material for surrounding the circumference of a pipe for feeding a molten substance of high temperature which comprises;

a supporting plate fixed to a lower end of the pipe which is suspended from a housing, a thermal insulation material arranged around the pipe and placed on the supporting plate, and a push-up means which connects the supporting plate to the housing and forces upwardly the supporting plate to support the thermal insulation material, whereby expansion forces of the pipe and the thermal insulation material are released downwardly against an urging force of the push-up means.

With the supporting device mentioned just above, thermal expansion quantity of the pipe and the thermal insulation material can be released downwardly against an urging force of the push-up means whereby the thermal expansion quantity of the pipe can be absorbed.

Preferred embodiments of the backup structure for a pipe for feeding a molten substance of high temperature of the present invention will be described in detail with reference to the drawings.

Figure 1:
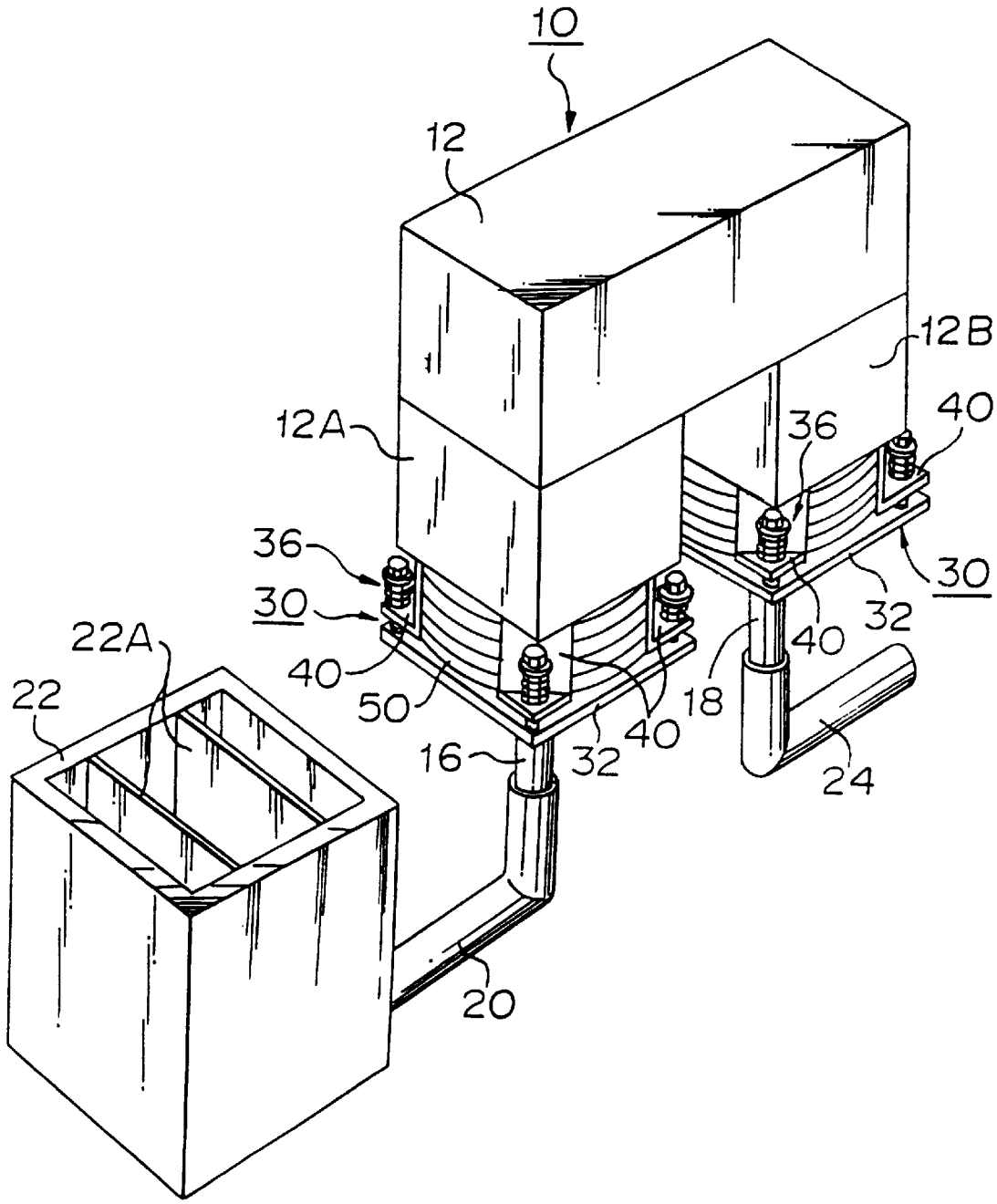
FIG. 1 is a perspective view of a vacuum degassing apparatus in which the backup structure for a pipe for feeding a molten substance of high temperature according to the present invention, is used.
Figure 2:
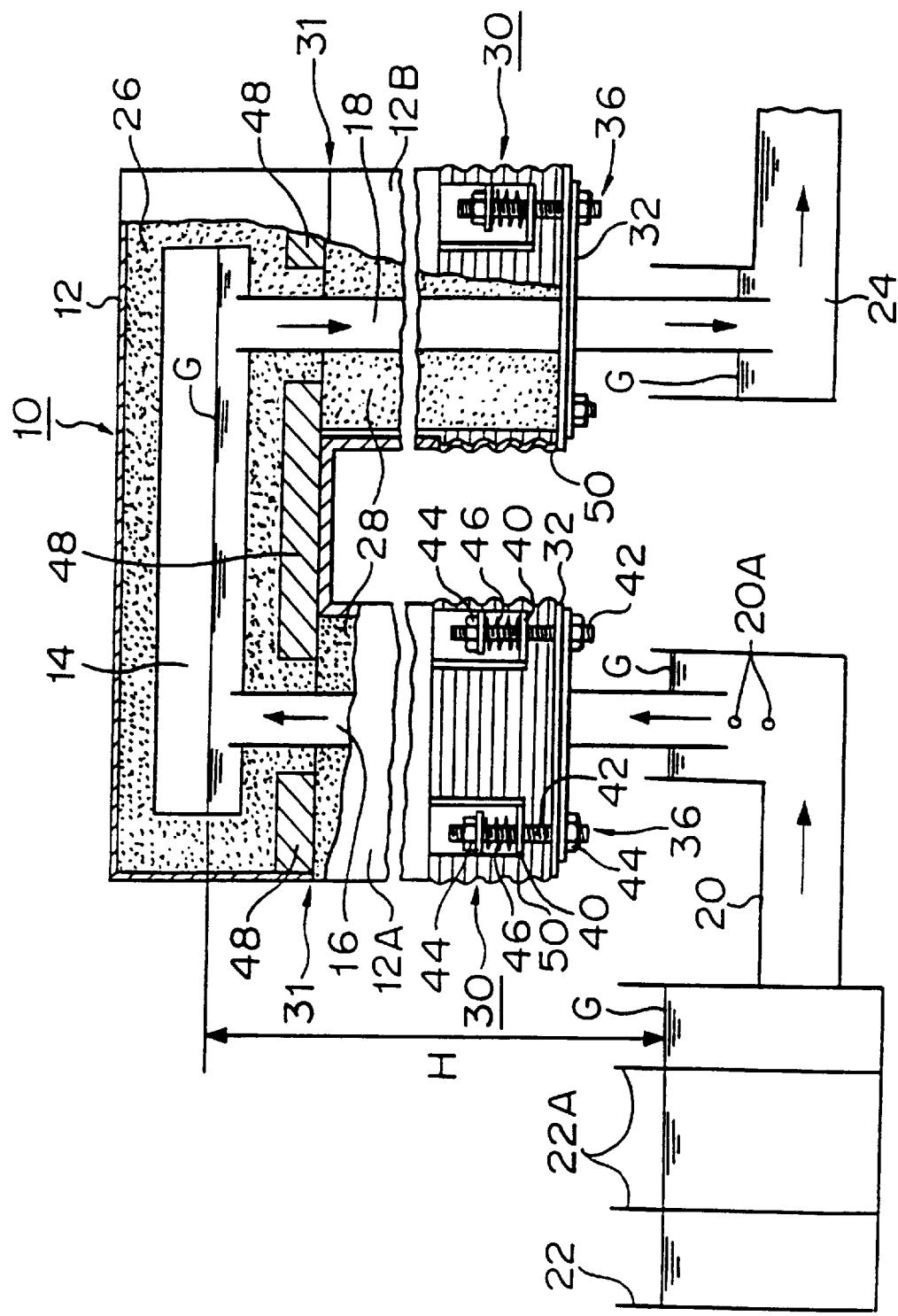
FIG. 2 is a diagram partly cross-sectioned showing the vacuum degassing apparatus in which the backup structure according to the present invention is used.

FIG. 1 is a perspective view showing a vacuum degassing apparatus in which the backup structure for a pipe for feeding a molten substance of high temperature of the present invention is used, and FIG. 2 is a longitudinal cross-sectional view of the vacuum degassing apparatus.

In FIG. 1, a vacuum degassing apparatus 10 includes a vacuum housing 12 which is generally in a gate-like form, i.e. an inverted U-form. As shown in FIG. 2, a vacuum degassing vessel 14 is disposed in an upper portion of the vacuum housing 12. An uprising pipe 16 (a pipe for feeding a molten substance of high temperature) made of platinum is connected to the vacuum degassing vessel 14 at a left end portion in the drawings, and a downfalling pipe 18 (a pipe for feeding a molten substance of high temperature) made of platinum is connected to the vacuum degassing vessel 14 at a right end portion in the drawings. The uprising pipe 16 and the downfalling pipe 18 are respectively disposed in leg portions 12A, 12B of the vacuum housing 12.

The lower end portion of the uprising pipe 16 is fitted to an open end of an upstream guiding duct 20 and is immersed in a molten glass G in the upstream guiding duct 20 which is communicated with melting tank 22. The lower end portion of the downfalling pipe 18 is fitted to an open end of a downstream guiding duct 24 and is immersed in the molten glass G in the downstream guiding duct 24.

Bricks 26 for heat insulation are disposed around the vacuum degassing vessel 14 so as to cover it. Bricks (thermal insulation materials) 28 for heat insulation are disposed so as to surround the uprising pipe 16 and the downfalling pipe 18 respectively so that the bricks 28 support the uprising pipe 16 and the downfalling pipe 18 respectively.

An example of a process for continuously degassing the molten glass in the vacuum degassing apparatus and supplying to a successive treatment furnace will be described.

First, air in the vacuum housing 12 and the vacuum degassing vessel 14 is sucked with a vacuum pump (not shown) to maintain a vacuum condition. Then, the molten glass G in the melting tank 22 is ascended in the uprising pipe 16 through the guiding duct 20 and is introduced into the vacuum degassing vessel 14. The molten glass G in the vacuum degassing vessel 14 undergoes a degassing treatment under a condition of reduced pressure. Then, the degassed molten glass G is introduced into the downstream guiding duct 24 through the downfalling pipe 18. In this case, a condition of reduced pressure in the vacuum degassing vessel 14 is set to be $1/20$ to $1/3$ atmospheric pressure. Further, the difference H between the levels of the molten glass G in the melting tank 22 and the molten glass G in the vacuum degassing vessel 14, is determined to be a difference of level to which the "siphon" principle is applied. Namely, when a pressure in the vacuum degassing vessel 14 is set to be $1/20$ to $1/3$ atmospheric pressure, a difference of level of about several meters is needed between the levels of the molten glass G in the melting tank 22 and the molten glass G in the vacuum degassing vessel 14 in order to apply the "siphon" principle to the vacuum degassing apparatus 10.

In the embodiment shown in FIG. 2, the vacuum degassing apparatus 10 comprises a pair of supporting devices 30 which support respectively pipes for feeding a molten substance of high temperature. The supporting devices 30 support respectively backup structures 31 (including the uprising pipe 16, the downfalling pipe 18 and the bricks 28 for heat insulation). Since the construction of the supporting device 30 and the backup structure 31 which support the uprising pipe is the same as the construction of the supporting device 30 and the backup structure 31 which support the downfalling pipe, description will be made only to the supporting device 30 and the backup structure 31 for the uprising pipe, and description on the supporting device 30 and the backup structure 31 for the downfalling pipe will be omitted.

Figure 3:
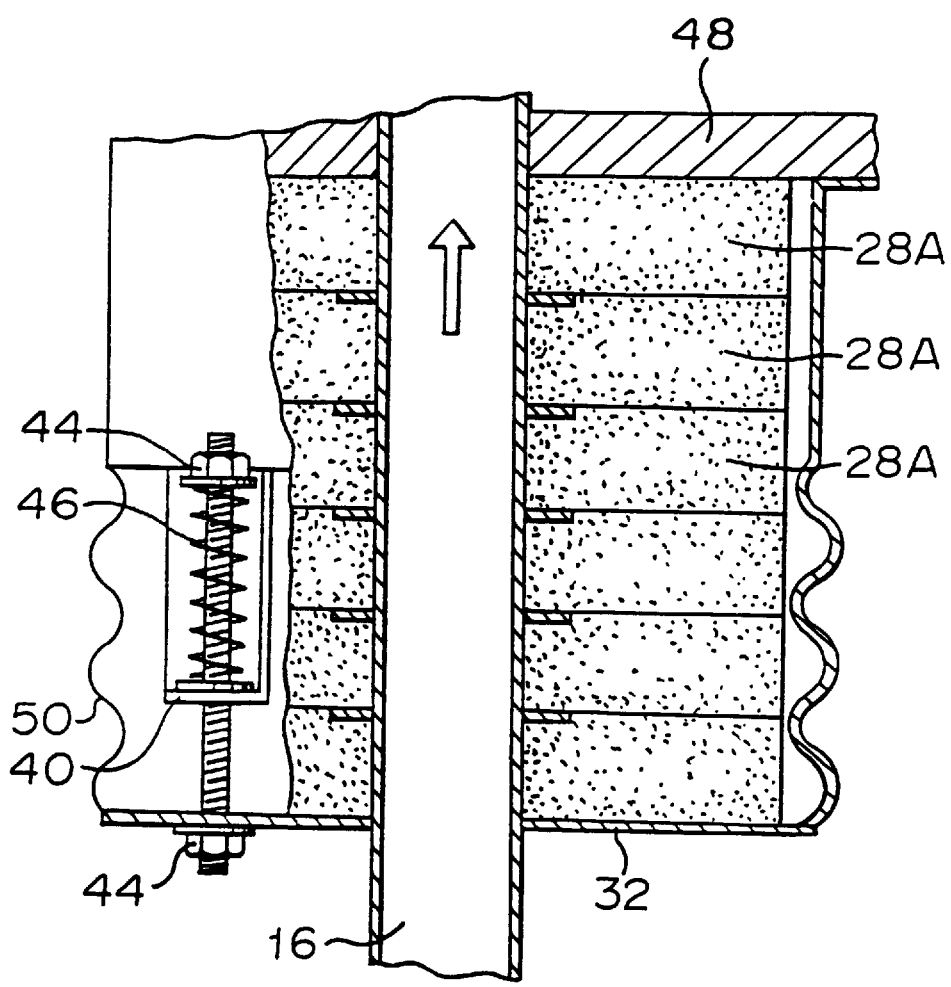
FIG. 3 is an enlarged front view partly cross-sectioned which shows an important portion of the backup structure according to the present invention.

As shown in FIG. 2, the supporting device 30 for the uprising pipe 16 comprises a supporting plate 32 and a push-up means 36. As shown in FIGS. 2 and 3, the bricks 28 are placed on the supporting plate 32, and the bricks 28 are arranged around the uprising pipe 16 so as to surround it.

The leg portion 12A of the vacuum housing 12 is formed to be a rectangular prism-like cylindrical form, and supporting members 40, 40 . . . are fixed at four corners of the leg portion 12A of rectangular prism-like cylindrical form (FIG. 1). The push-up means 36 connects the leg portion 12A to the supporting plate 32 and urges the supporting plate 32 upwardly. The supporting members 40, 40 . . . accommodating push-up means 36 are arranged at the four corners of the supporting plate 32 having a rectangular shape. As shown in FIG. 2, a bolt 42 in each of the push-up means 36 is fitted to an opening formed in the lower end portion of each of the supporting members 40 and each opening formed in the supporting plate 32 (the both opening are not shown in the Figures).

Nuts 44, 44 are screwed to the upper and lower ends of the bolt 42 respectively, and a coil spring 46 is disposed between the lower end portion of the supporting member 40 and the nut 44 at the upper end portion of the bolt 42 in a compressed state. Accordingly, the urging force of the coil spring pushes the bolt 42 upwardly, and the supporting plate 32 is pushed upwardly by means of the bolt 42.

Then, the bricks 28 which are placed on the supporting plate 32 is pushed upwardly whereby the upper surface of the uppermost brick 28 is pushed to a pressing plate 48, and the bricks 28 arranged around the uprising pipe 16 and the downfalling pipe 18 are supported. Further, a cylindrical bellows 50 is disposed to connect between the leg portion 12A of the vacuum housing 12 and the supporting plate 32 and to accommodate the bricks 28 therein whereby the inside of the vacuum housing 12 can be kept to be in an airtight condition. Accordingly, air in the vacuum housing 12 can be sucked by a vacuum pump (not shown).

Figure 4:
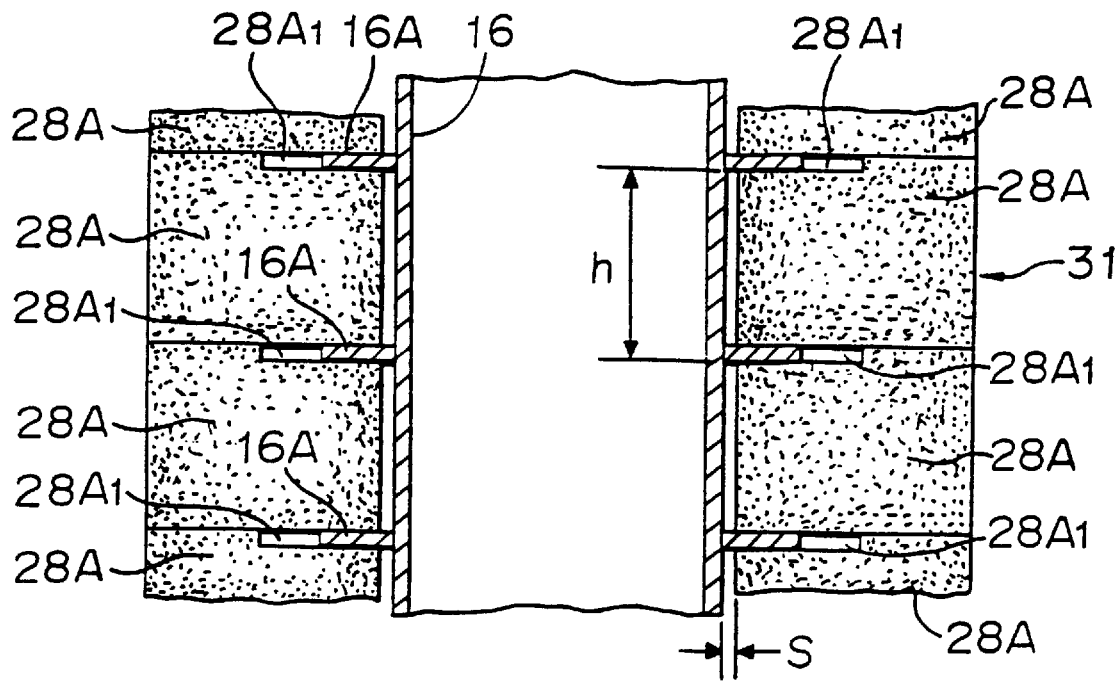
FIG. 4 is an enlarged cross-sectional view showing an embodiment of the backup structure of the present invention in which flanges provided in an uprising pipe are held from their both sides.

As shown in FIG. 4, the backup structure 31 for a pipe for feeding a molten substance of high temperature according to the present invention is provided with flanges of annular shape (annular projections) 16A, 16A . . . at the outer circumference of the uprising pipe 16 with certain intervals h in the vertical direction. Further, the bricks 28A . . . for heat insulation used for the backup structure are stacked at the outer circumferential side of the uprising pipe 16 so that each of the flanges 16A is interposed between upper and lower bricks 28A, 28A which are in contact in their substantial portions.

Namely, a recess 28A1 is formed at an upper surface of each of the bricks 28A, and the depth of the recess 28A1 is substantially the same as the thickness of each of the flanges 16A. When the bricks 28A are stacked, each of the flanges 16A is received in each of the recesses 28A1 of bricks, and the upper surface of the flange 16A in the recess 28A1 is pressed by the bottom surface of the brick 28A stacked on it. Thus, the flange 16A is interposed between the upper and the lower bricks 28A, 28A which are mutually in contact.

Figure 5:
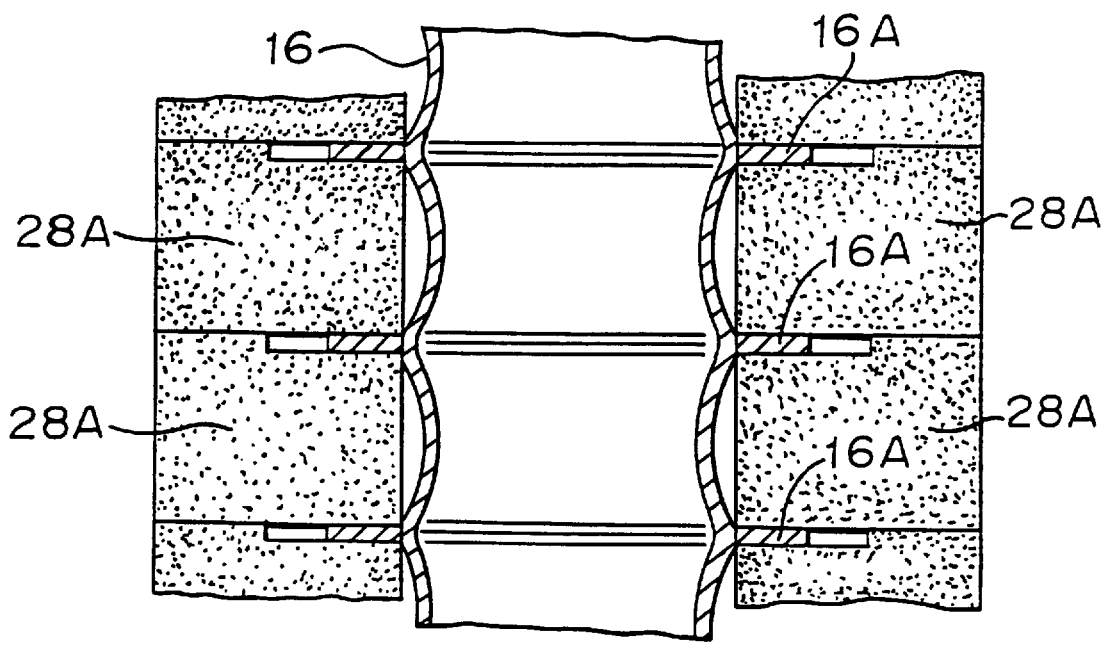
FIG. 5 is an enlarged cross-sectional view showing the backup structure of the present invention in which the pipe is in an expanded state.

Since the thermal expansion coefficient of the uprising pipe 16 of platinum is higher than the thermal expansion coefficient of the bricks 28A . . . , the elongation of a part of uprising pipe 16 which is between vertically adjacent flanges 16A, 16A is larger than that of the brick 28A arranged between adjacent flanges 16A, 16A. Accordingly, the elongation in the axial direction of the part of uprising pipe 16 is restricted by the bricks 28A whereby the part of uprising pipe is deformed inwardly in a curved form or a sinuous form as shown in FIG. 5. The elongation in the axial direction of the uprising pipe as a whole corresponds to the elongation of the stacked bricks 28A. Then, the uprising pipe 16, the downfalling pipe 18 and the stacked bricks 28 when they are thermally expanded, stretch downwardly against the urging force of the coil spring 46.

In this case, a difference of thermal expansion between the uprising pipe 16 and the bricks 28A is dispersed in the portions between vertically adjacent flanges 16A, 16A. Accordingly, deformation quantities of thermally expanded portions in the uprising pipe 16 are uniformly dispersed between adjacent flanges 16A, 16A which respectively correspond to that portions, whereby the deformation quantities of the portions in the uprising pipe 16 can be minimized.

In a preferred embodiment of the present invention, the bricks 28A are electro-galvanized bricks of zirconia type, for instance, and have corrosion resistance to the molten glass G. Accordingly, even when the molten glass G leaks outside the uprising pipe 16 due to a crack in the uprising pipe 16, leaking of the molten glass G can be suppressed by the bricks 28A . . . having corrosion resistance.

As shown in FIG. 4, there is a certain space s between the stacked bricks 28A . . . and the outer circumference of the uprising pipe 16. The space s can accommodate an amount of expansion of the uprising pipe 16 when it is expanded outwardly due to its thermal expansion. Accordingly, deformation of the uprising pipe 16 caused by the contact of it to the bricks 28A . . . at the time of the thermal expansion can be prevented.

The function of the backup structure 31 for a pipe for feeding a molten substance of high temperature constructed according to the present invention will be described.

An urging force of each of the coil springs 46, 46 . . . is adjusted by turning each of the nuts 44, 44 . . . screwed to the upper end portion of each of the bolts 42, 42 . . . which are elements for constituting the supporting device 30 of the present invention, so that a pressing force wherein the bricks 28 placed on the supporting plate 32 push the pressing plate 48, is brought to a predetermined value. Then, the vacuum pump (not shown) is operated to suck air in the vacuum housing 12 and the vacuum degassing vessel 14 in a vacuumed condition.

Then, the uprising pipe 16 and other structural elements are heated to be at a constant temperature by supplying an electric current. The molten glass G in the melting tank ascends in the uprising pipe 16 to be introduced to the vacuum degassing vessel 14 in which the molten glass G is degassed under a reduced pressure condition. Then, the molten glass G which has undergone degassing is introduced to the downstream guiding duct 24 through the downfalling pipe 18.

During the above-mentioned operations, the uprising pipe 16, the downfalling pipe 18 and the bricks 28 are expanded by heat. Since the flanges 16A are held at their both sides by upper and lower bricks 28A, 28A, the elongation in the axial direction of the uprising pipe 16 is restricted by bricks 28A whereby it is bent inwardly with respect to the outer circumference of the uprising pipe 16 as shown in FIG. 5. Accordingly, the elongation in the axial direction of the uprising pipe 16 itself corresponds to the elongation of the stacked bricks 28A as a whole.

Accordingly, a difference of thermal expansion between the uprising pipe 16 and the stacked bricks 28A is dispersed in the portions of the uprising pipe 16 which correspond to the distance between vertically adjacent flanges 16A, 16A. As a result, the deformation quantities of the uprising pipe 16 are dispersed uniformly in the portions between adjacent flanges 16A, 16A whereby the deformation quantity of the uprising pipe 16 in its entirety can be minimized.

Further, the bricks 28A . . . have corrosion resistance to the molten glass G. Accordingly, even when a crack or the like takes place in the uprising pipe 16 and the molten glass G leaks outside the uprising pipe 16, there is no leakage of the molten glass G since the bricks 28A . . . are not corroded.

Further, since the bricks 28A . . . are arranged with a predetermined space s with respect to the outer circumference of the uprising pipe 16, the space s absorbs the expansion of the uprising pipe 16 in the outer circumferential direction when it is expanded by heat. Accordingly, the forcible contact of the uprising pipe 16 to the bricks 28A . . . at the time of the thermal expansion can be prevented to thereby avoid the deformation of the uprising pipe 16.

As described above, the upper end portion of the stacked bricks 28A . . . for restricting the elongation in the axial direction of the uprising pipe 16 is in contact with the pressing plate 48. Accordingly, the uprising pipe 16 and the stacked bricks 28A . . . elongate downwardly, and the elongation quantities in the axial direction of the uprising pipe 16 and the stacked bricks 26A . . . are the same.

When the thermal expansion in the downward direction of the uprising pipe 16 and the bricks 28A . . . takes place, the position of each of the nuts 44, 44 . . . screwed to the lower end of each of the bolts 42, 42 . . . descends along with the supporting plate 32. Accordingly, the position of each of the nuts 44, 44 . . . screwed to the upper end of each of the bolts 42, 42 . . . descends to compress each of the coil springs 46, 46 . . . . When the thermal expansions of the uprising pipe 16, the downfalling pipe 18 and the bricks 28A . . . become large the spring action of each of the coil springs 46, 46 . . . is increased.

Accordingly, an urging force of each of the coil springs 46, 46 . . . should be adjusted by turning each of the nuts 44, 44 . . . screwed to the upper end of each of the bolts 42, 42 . . . , depending on the thermal expansion quantities of the uprising pipe 16, the downfalling pipe 18 and the bricks 28A . . . .

Figure 6:
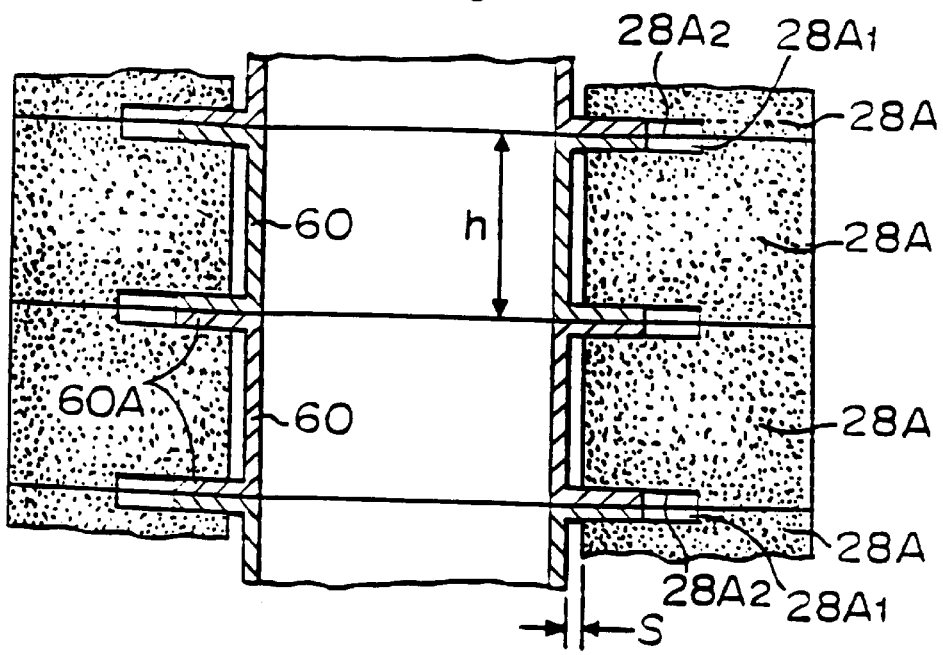
FIG. 6 is an enlarged cross-sectional view showing another embodiment of the backup structure for pipe for feeding a molten substance of high temperature according to the present invention.
Figure 7:
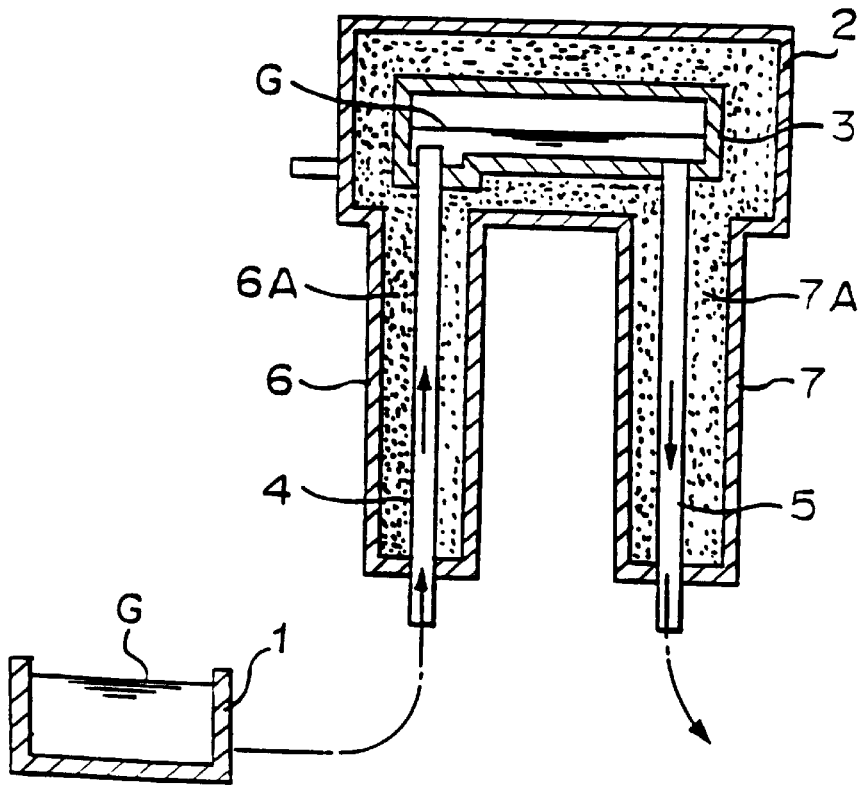
FIG. 7 is a cross-sectional view of a conventional vacuum degassing apparatus.

In the above-mentioned embodiment, description has been made as to the case that the flange 16A, 16A . . . are formed at the outer circumference of the uprising pipe 16 at predetermined intervals. However, an embodiment as shown in FIG. 6 wherein the uprising pipe 16 comprises a plurality of segmentary pipes 60A arranged on the same axial line, and a pair of flanges 60A are formed at upper and lower end portions of each of the segmentary pipes 60, may be used. In this case, two flanges 60A, 60A are overlaid. Accordingly, a recess 28A1 is formed in the upper end portion of the brick 28A, and a recess 28A2 is formed in the lower end portion of the brick 28A. Thus, the two overlaid flanges 60A, 60A are held by the bricks 28A, 28A stacked vertically in the same manner as the above-mentioned embodiment. Even when a segmentary pipe 60 is deformed by a bending stress, the bending stress is not transmitted to adjacent segmentary pipes 60, 60. Accordingly, a deformation quantity in the pipe can further be minimized.

Besides the above-mentioned embodiment wherein the supporting device 30 is expanded in the direction of the pipe depending on the thermal expansion in the downward direction of the bricks 28, there is another embodiment wherein the supporting device comprises a plurality of containers arranged in the direction of the pipe; the plurality of containers are independent in a time period that the pipe is not in an elevated temperature; and the plurality of containers are fixedly connected by means of a caulking material or welding in a time period that the pipe is in an elevated temperature by passing therethrough a molten substance of high temperature.

As described above, in accordance with the backup structure for a pipe for feeding a molten substance of high temperature according to the present invention, a plurality of projections projecting from the pipe are held by a thermal insulation material. Accordingly, a deformation quantity of the pipe at the time of thermal expansion can be dispersed uniformly between adjacent projections. With such structure, a deformation in the pipe can be kept small. Accordingly, a failure such as cracking is prevented from occurring in the pipe to increase safety for the structure.

Further, in accordance with an embodiment of the present invention, the pipe comprises a plurality of segmentary pipes arranged on the same axial line. Even when there takes place a deformation in a segmentary pipe by a bending stress, the bending stress is not transmitted to adjacent segmentary pipes. Accordingly, a deformation by a bending stress in the pipe can further be minimized.

Further, since a gap is formed between the outer circumference of the pipe and the thermal insulation material, a thermal expansion quantity in the outer circumferential direction of the pipe, when thermally expanded, can be released in the gap. Accordingly, a deformation in the pipe by the press-contact of it to the thermal insulation material can be prevented.

Further, in accordance with an embodiment of the supporting device for supporting the thermal insulation material which surrounds the pipe for feeding a molten substance of high temperature, the length of the supporting device along the direction of the pipe is partially changeable between a time period that the pipe is in an elevated temperature by passing therethrough the molten substance of high temperature and a time period that the pipe is not in an elevated temperature, and the length of the supporting device in the direction of the pipe is elongated at the time of high temperature. Accordingly, the thermal expansion quantity of the pipe can be absorbed.

Further, in accordance with an embodiment of the present invention, a supporting plate is fixed to a lower end of the pipe and a thermal insulation material is arranged around the pipe. The supporting plate is connected to a housing by means of a push-up means which supports the thermal insulation material by urging upwardly the supporting plate. Accordingly, thermal expansion quantities of the pipe and the thermal insulation material are released downwardly against an urging force of the push-up means. The thermal expansion quantity of the pipe is absorbed, and security in a device using the pipe can be assured.

In accordance with an embodiment of the present invention, the housing and the supporting plate are connected by a cylindrical bellows, and the cylindrical bellows accommodates the thermal insulation material. With this structure, the inside of the housing is maintained in an airtight condition, and the inside of the housing can be brought to a vacuum condition by operating a vacuum pump communicated to the housing.

We claim:

1. A backup structure for a pipe for feeding a molten substance of high temperature which comprises a pipe for feeding a molten substance of high temperature and a thermal insulation material surrounding the pipe wherein the pipe is provided with a plurality of projections on its outer periphery at predetermined intervals, and each of the projections is held at its both sides by the thermal insulation material, wherein said thermal insulation material comprises a plurality of stacked bricks, and wherein each projection acts as a boundary for adjacent bricks.

2. The backup structure according to claim 1, wherein the pipe for feeding a molten substance of high temperature comprises a plurality of segmentary pipes arranged on the same axial line, and each of the segmentary pipes has a pair of flanges at its both ends so that each flange constitutes an element of each of the projections.

3. The backup structure according to claim 1, wherein a gap is formed between the pipe for feeding a molten substance of high temperature and the thermal insulation material so as to absorb a deformation of flexture of the pipe, and each of the projections is held at its both sides by the thermal insulation material so as to minimize the deformation.

4. The backup structure according to claim 1, which further comprises a supporting device for supporting the thermal insulation material which surrounds the pipe through which a molten substance of high temperature is passed, wherein the length in the direction of the pipe of the supporting device is made partially changeable between a time that the pipe is at an elevated temperature due to passing therethrough a molten substance of high temperature and a time that the pipe is not at an elevated temperature.

5. The backup structure according to claim 4, wherein the supporting device comprises a container for supporting the thermal insulation material, a part of the container having contraction and expansion properties.

6. The backup structure according to claim 1, which further comprises a supporting device comprising:

a supporting plate fixed to a lower end of the pipe for feeding a molten substance of high temperature, the pipe being suspended from a housing, and a push-up means which connects the supporting plate to the housing and forces upwardly the supporting plate to support the thermal insulation material, wherein the thermal insulation material is arranged around the pipe for feeding a molten substance of high temperature and is placed on the supporting plate, wherein said supporting device surrounds the circumference of the pipe for feeding a molten substance of high temperature and releases downwardly an expansion force of the pipe and the thermal insulation material against an urging force of the push-up means.

7. The backup structure according to claim 6, wherein a cylindrical bellows connects the housing to the supporting plate, and the thermal insulation material is received in the cylindrical bellows so as to keep the inside of the housing in an airtight condition.

8. A backup structure for a pipe for feeding a molten substance of high temperature which comprises:

a solid thermal insulation material arranged around a pipe for feeding a molten substance of high temperature and a container for receiving and supporting the solid thermal insulation material wherein the container is partially changeable in the direction of the pipe between a time that the pipe is at an elevated temperature due to passing therethrough a molten substance of high temperature and a time that the pipe is not at an elevated temperature.

9. The backup structure according to claim 8, wherein a part of the container has contraction and expansion properties.

10. A supporting device for supporting a thermal insulation material for surrounding the circumference of a pipe for feeding a molten substance of high temperature which comprises;

a supporting plate fixed to a lower end of the pipe for feeding a molten substance of high temperature, the pipe being suspended from a housing, a solid thermal insulation material arranged around the pipe and placed on the supporting plate, and a push-up means which connects the supporting plate to the housing and forces upwardly the supporting plate to support the thermal insulation material, whereby an expansion force of the pipe and the thermal insulation material is released downwardly against an urging force of the push-up means.

11. The supporting device according to claim 10, wherein a cylindrical bellows connects the housing to the supporting plate, and the thermal insulation material is received in the cylindrical bellows so as to keep the inside of the housing in an airtight condition.

* * * * *